United States Patent [19]

Chartet

[11] 3,857,164
[45] Dec. 31, 1974

[54] METHOD FOR BRAZING RADIATORS MADE OF ALUMINUM

[75] Inventor: André Chartet, Hauts de Seine, France

[73] Assignee: Societe Anonyme des Ueines Chausson, Asnieres, France

[22] Filed: Aug. 4, 1972

[21] Appl. No.: 278,085

[30] Foreign Application Priority Data
Aug. 6, 1971 France .............................. 71.28868
Mar. 17, 1972 France ............................ 72.09446

[52] U.S. Cl. ......... 29/483, 29/157.3 R, 29/157.3 A, 29/157.3 D, 29/495, 29/502, 165/152
[51] Int. Cl. ......................... B23k 1/20, B23k 31/02
[58] Field of Search . 29/157.3 A, 157.3 B, 157.3 D, 29/495, 496, 502, 482, 483, 503, 475

[56] References Cited
UNITED STATES PATENTS
2,399,103  4/1946  Clinedirst ........................ 29/483 X
2,958,941  11/1960 Goerg, Sr. ....................... 29/503 X
3,074,158  1/1963  Finnegan ......................... 29/495
3,209,440  10/1965 Karmazin ....................... 29/157.3 B
3,451,114  6/1969  Werneke ......................... 29/495 X
3,456,331  7/1969  Holden ............................ 29/502 X
3,472,316  10/1969 Couch, Jr. .................. 29/157.3 B X
3,503,631  3/1970  Greever ......................... 29/483 X
3,710,858  1/1973  Young ....................... 29/157.3 R X OTHER PUBLICATIONS
Braying Aluminum, Reynolds Metals Company publication, 1958, pp. 1–27.

Primary Examiner—Andrew R. Juhasz
Assistant Examiner—Ronald J. Shore
Attorney, Agent, or Firm—Imirie, Smiley & Linn

[57] ABSTRACT

A part to be assembled is maintained applied by an edge having a continuous contact line with another part to manage a capillary interval, a liquid flux is deposited only on the outer side of the parts so that the flux wets only a very small height of the inner wall, the aqueous support of the flux is evaporated, then heating is performed up to the melting temperature to melt the brazing film which is drawn up through capillary action only by the flux wet portions.

6 Claims, 10 Drawing Figures

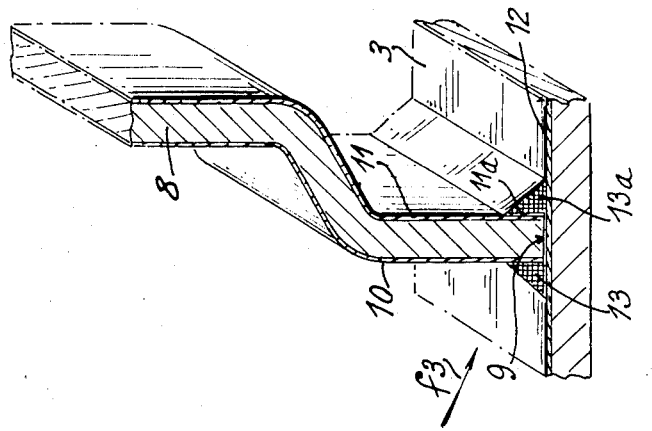
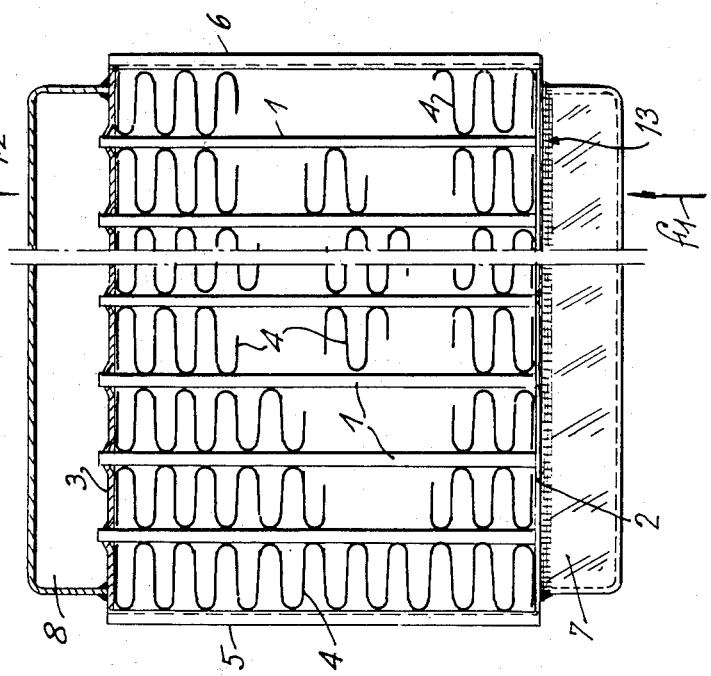

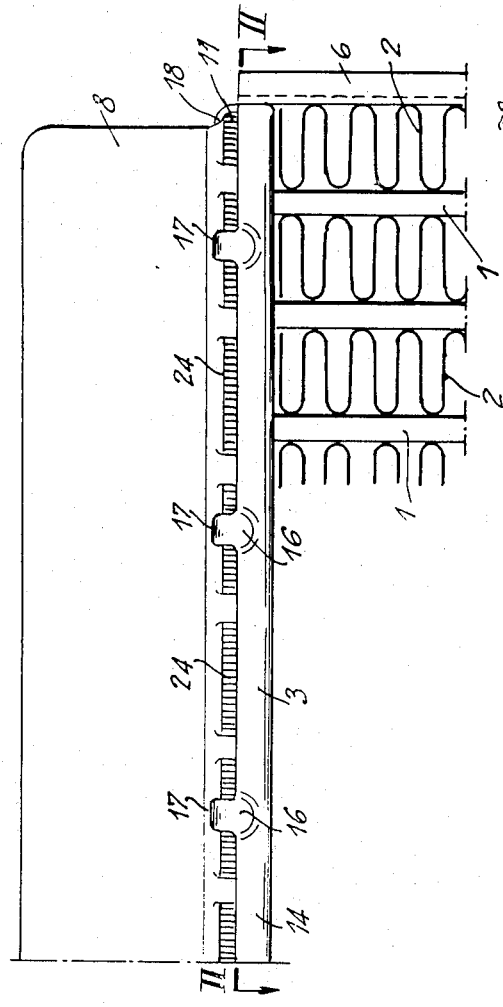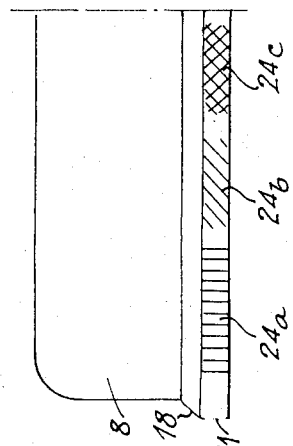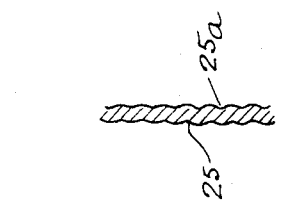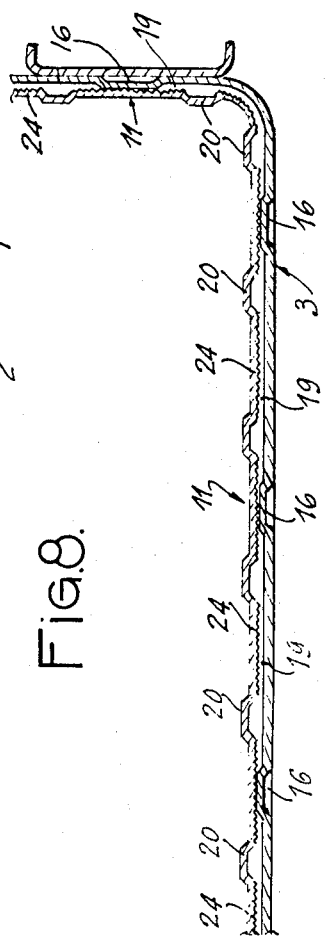

METHOD FOR BRAZING RADIATORS MADE OF ALUMINUM

BACKGROUND OF THE INVENTION

This invention relates to radiators entirely made of aluminum the parts thereof being brazed together.

Up to now, it has been possible to produce radiator cores, especially of the tube and tube plate type, entirely made of aluminum, by brazing the tubes to the tube plates and by brazing the same also with heat dissipators extending between each tube.

However it has not been possible yet to safely and industrially effect the simultaneous brazing of the header-boxes when brazing is performed in a furnace, as it is practically required in mass production. In fact, it is well known that brazing between a header-box and a tube plate requires large joints which could be several tens of centimeters long, and then the phenomena due to gravity exerted on the molten brazing alloy has a preponderant importance because it causes the brazing alloy to flow out at the lower portion of the radiators when the same are moved in the brazing furnace.

It has also been noted that the same phenomena exists during the fluxing step to be performed before the brazing step properly so called.

SUMMARY OF THE INVENTION

This invention solves the problem of the simultaneous brazing of all the parts of a radiator, including the header-boxes and while providing a great saving of flux by comparison with known technics when brazing is performed with a previous fluxing step.

According to the invention, all the radiator parts are at least partly covered with a brazing film and are assembled, to maintain them applied by an edge having a continuous contact line with a corresponding part, with a capillary interval between said assembled parts of the radiator, a liquid flux is deposited only on the outside of the assembled radiator whereby said flux begins to be drawn up into the capillary interval and wets only through a capillary effect a very small length of wall inside the assembled radiator, dehydratation of the flux is then performed and the radiator is heated to the melting temperature of the flux whereby the capillary circulation of said flux is maintained while causing the parts at the joint and vicinity thereof of the complete wetting of a brazed connection to be made, heating of the radiator is then continued up to melting temperature of the brazing film whereby the resulting liquid brazing material is drawn up only in the capillary intervals and the portions wet with the flux.

The invention also encompasses a radiator for the embodiment of the above described method.

According to this second arrangement of the invention, the tube plates delimit, at the periphery thereof, a flat area covered with a brazing film and on which is maintained applied an edge formed by the bottom of the rim of the corresponding water-box.

BRIEF DESCRIPTION OF THE DRAWINGS

FIG. 1 is a diagrammatic elevational view, partly in cross-section, of a radiator core illustrating the method of the invention;

FIG. 2 is a enlarged diagrammatic perspective view, illustrating a detail of the invention;

FIG. 7 is a partial elevation view similar to FIG. 3 of a variant;

FIG. 8 is a sectional view taken along line VIII—VIII of FIG. 7;

FIG. 9 is a partial elevation view of a water-box illustrating various alterations, and FIG. 10 is an enlarged sectional view illustrating a detail of embodiment.

DETAILED DESCRIPTION OF THE INVENTION

Figure 3:
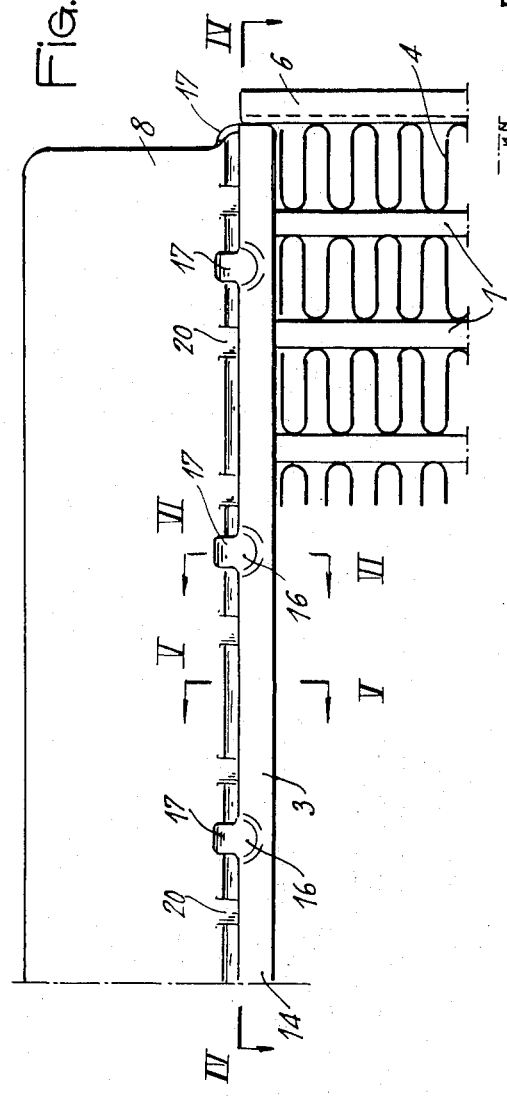
FIG. 3 is a partial elevational view of a preferred embodiment of the radiator according to the invention.

According to the invention, for the manufacture of a radiator core made of aluminium, the ends of tubes 1 are inserted into holes in tube plates 2 and 3. The tubes 1 having their lateral walls connected through dissipators 4, for example constituted by corrugated strips, lateral plates 5 and 6 are then placed at ends of the tube plates and said tube plates 2 and 3 are covered with header-boxes 7 and 8.

Figure 6:
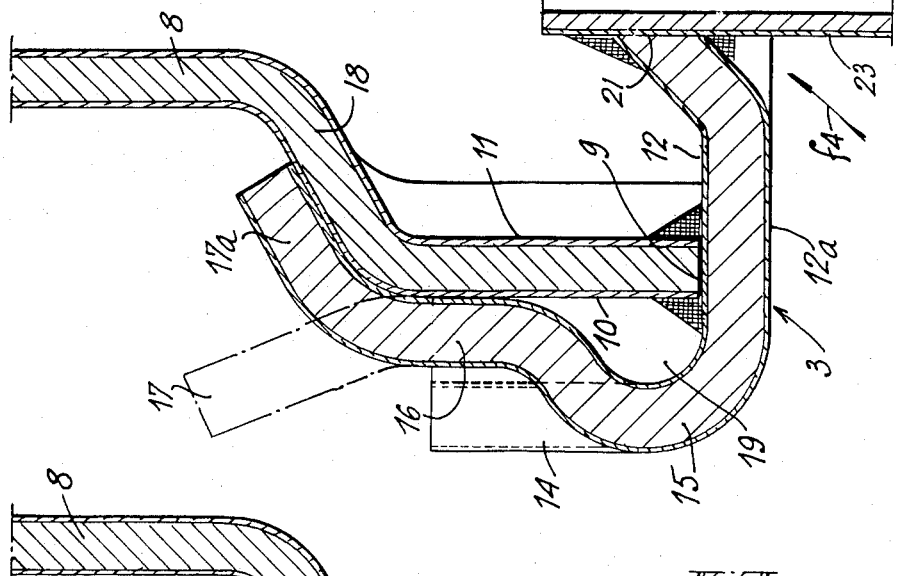
FIG. 6 is an enlarged sectional view taken along line V—VI of FIG. 3.
Figure 5:
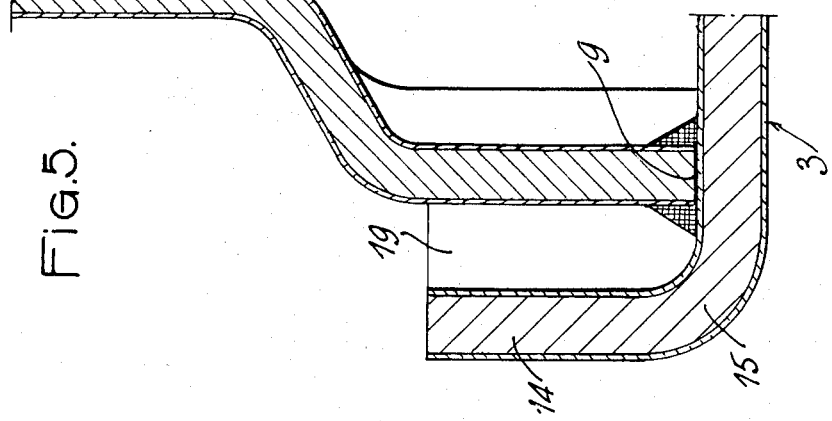
FIG. 5 is an enlarged sectional view taken along line V—V of FIG. 3.

As shown in FIG. 2 and also in FIGS. 5 and 6, the peripheral edge 9 of the header-boxes 7 and 8 must be flat and must also bear on a flat portion of the tube-plates 2 or 3.

FIG. 2 also shows that the header-boxes 7 and 8, are made of aluminum which is covered on the two sides thereof with brazing films 10 and 11. A film of brazing alloy 12 is also designed at least on the side of the tube plate where is bearing the edge 9 of each header-box and preferably, the tube plates have a film of brazing alloy on their two sides.

The brazing films 10, 11 and 12 are normally constituted by an aluminum-silicon alloy.

When all the parts of the radiator are assembled as described, the header-boxes 7 and 8 are maintained applied against the tube plates 2 and 3 as shown by arrows $f1$ and $f2$ (FIG. 1) to provide the peripheral edge 9 to bear and be firmly applied on the brazing film 12 of said tube plates.

The next step is constituted by a fluxing of the radiator parts, said fluxing affecting at least the contacting portions of the various parts having to be brazed together.

According to an important characteristic of the invention, fluxing is only performed on the outer walls of the radiator, for instance by spraying thereon an aqueous solution containing a flux designed to remove the oxide coating covering the parts at the joint and vicinity thereof of the connection between the header-box and the tube plate, the flux is advantageously sprayed in the direction indicated by arrow $f3$ of FIG. 2.

Because of the very small interval necessarily existing between the edge 9 of each header-box and the engaged surface of each tube plate, the flux, which is very liquid, flows into said interval through capillary action and is maintained therein. Actually, it should be noted that said interval has always a smaller length than wall thickness of the header-box and this whatever be the position of the assembled radiator, i.e., whether the header-boxes 7 and 8 are horizontally extended as shown in FIG. 1 or whether said header-boxes are vertically placed if the radiator is rotated 90° in comparison with the illustration shown in FIG. 1.

The very liquid state of the flux applied according to the arrow $f_3$ causes the flux, after having passed into the interval necessarily separating the edge 9 of the header-box from the opposite surface of the tube plate, creeps slightly on the base 11a of the film 11 which is inside the header-box thus the flux starts to wet the two walls extending on each side of the edge 9, but the width on which the films 11, 12 are wetted is very small, within the range of about 1 mm.

After evaporating the aqueous support of the flux, which is advantageously performed in an oven, the whole radiator with its header-boxes 7 and 8, applied on the tube plates 2 and 3, is passed into a brazing furnace wherein it is heated to cause melting of the flux which then again becomes very liquid, thus completing the wetting of the portions to be brazed. The temperature of the furnace is then raised to produce melting of the brazing films 10, 11 and 12. The molten aluminum-silicon brazing alloy being very fluid tends, to run out but it is maintained through a capillary action the portions where the surface-tension phenomena are preponderant to the gravity action, i.e., level with the connection of the edge 9 of the water-box with the engaged portion of each tube plate. The brazing step is performed where fluxing has been efficient, i.e. only on the areas which ahave been wet with the flux and in which the capillary action phenomena are preponderant gravity. Thus, there is effected, as shown in FIG. 2, a double brazing line 13, 13a, the brazing also affecting of course the edge 9 itself of the header-box 10 and the engaged portion of the tube plate 3 since this is the area where the capillary action phenomena occur more intensively.

According to the invention, it is advantageous that during the performance of the brazing step, the whole radiator be maintained in the position shown in FIG. 1, that is with horizontal header-boxes 7 and 8, because the two header-boxes are then uniformly brazed and, besides, when the radiator is fluxed only on its outer face said position reduces the risks of the flux running on the inner walls of the header-boxes which then prevents or at least shortens the time duration for the inner washing of the finished radiator when it is cooled after completion of the brazing process.

To make easier the performance of the above described method, the invention relates also to a special radiator in which, as shown in FIGS. 3 to 6, the tube plates 2 and 3 are provided with a flange 14 extending on their whole periphery which is folded towards the header-box. Since the flange 14 is folded it necessarily has a curved area 15, FIGS. 5 and 6, extending between the plane delimited by the bottom of each tube plate and the plane delimited by said flange.

Figure 4:
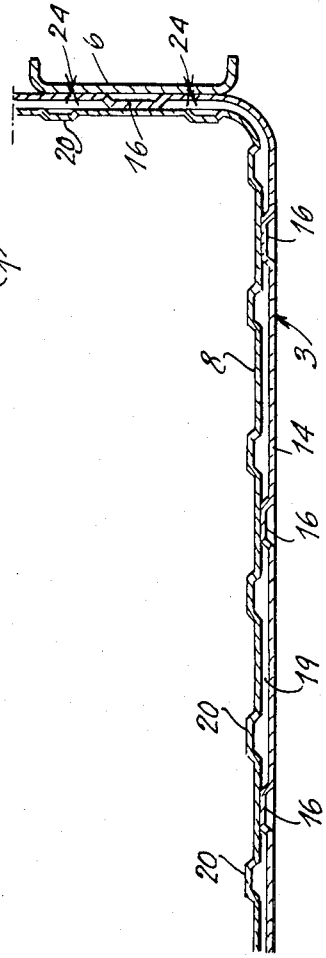
FIG. 4 is a sectional view taken along line IV—IV of FIG. 3.

Because of the curved area 15, spaced small embossings 16 are formed in the flange 14, as better shown in FIG. 4, the height of said embossings being greater than the radius of the curved area 15. There can be a plurality of embossings along the long sides of the tube plate, and at least one embossing 16 in each small side of the tube plate.

Furthermore, the flange 14 of the tube plates is extended at the level of the embossings 16 by lugs 17 which, before mounting the header-box, are curved to be widened towards the outside as shown in phantom lines in FIG. 6.

Due to the existence of the flange 14, the lateral plates 5 and 6 can be fixed to the tube plates, after placing the same on the tubes 1, by electric welding points 24 (FIG. 4). Besides, the widened lugs 17 then facilitate the positioning of the header-boxes, because they act as guides centering the header-boxes relative to the tube plates, the embossings 16 causing the edge 9 of each header-box which is not covered with a brazing alloy, to bear inside the curved area 15 on flat portion of the tube plate.

Furthermore, the lower portion of the skirts of the header-boxes are shaped to delimit at least a peripheral step 18 extending at a level lower than the level to which the lugs 17 extend. The step 18 is formed for various reasons. First, said step constitutes a stiffening element for the bottom of the header-box skirt, thereby providing accuracy in the positioning of the edge 9. Moreover the step 18 constitutes a bearing surface for the free ends 17a of the lugs 17 for maintaining the header-boxes relative to the tube plates before performing the brazing process. Lastly, the step 18 constitutes so to speak, a solution of continuity in the outer wall of each header-box, said solution of continuity preventing the formation of trickles of both the flux and the brazing alloys, said trickles starting easily on flat surfaces.

Care is taken when determining the manufacturing characteristics of the tube plates, that the radius of the curved area 15 be as small as possible and that the embossings 16 be just protruding of a measure substantially corresponding to said curve radius in a way to manage, between the header-box and the flange 14, a canal 19 (FIG. 5) of a very small width, for instance in the range of about 1 mm, in which the flux tends to be retained by a capillary effect. Consequently, the amount of flux so collected in the canal 19 facilitates the wetting of the edge 9 which is not covered with a brazing film, of the base 11a of the brazing film 11 of the header-box and of the adjacent portion of the tube plate. To still better maintain the flux in the canal 19, especially when the radiator must be brazed while being maintained in a position in which the water-boxes are vertical, it has been found advantageous, further, to shape substantially in zigzag the portion of the header-boxes within the flange 14, or at least to form successive stampings 20 (FIG. 4) constituting spaced enlargements in the canal 19, which prevent escape of the flux and of the brazing alloy when they are molten.

When the tube plates are covered on both sides thereof with brazing films 12 and 12a, as shown in FIG. 6, it is advantageous, further, that tube passages 21, designed for engaging the ends of the tubes 1, be produced by stamping and which result in small cups 22 in the opposite side of the plate.

Then the tubes 1 with outer walls thereof covered with a brazing film 23 are inserted into the tube passages 21 and the flux is sprayed in direction of arrows $f4$ in order that said flux tends to fill up the small cups 22. Thus the brazed connection, between the tube and the tube plate, is effected in the same way as the brazed connection between the tube plate and water-box with the same reliability while spraying the flux only from the exterior of the radiator, which prevents the further rinsing step of the inside of the radiator.

According to FIGS. 7 – 10, at least the outer side of the flange 11, which is partly fitted into the tube plate has roughnesses 24 formed through milling or a similar process, delimiting, thereby on the surface of the header-box flange, a multitude of capillary roughnesses tending to retain the brazing flux as well as the brazing alloy when they are applied and melted. The brazing process can be thus easily performed in a furnace, whatever be the position occupied by the radiator in the furnace, i.e., whether the header-boxes contained therein are placed vertically or horizontally. In fact, the flux and also the brazing alloy when melted are very liquid and they tend to spontaneously run out through gravity. On the contrary, the capillary forces then become proponderant and both the flux and the brazing alloy are thus directed by capillary action towards the connection to be formed between the end edge of the header-box and the engaged wall of the tube plate, said connection presenting itself a capillary size.

Still further, the header-box may have successive stampings 20 constituting discontinuities into the canal 19 and cooperating also to prevent the running out of the flux and of the brazing alloy when they are melted.

FIG. 9 shows that the stampings 20 are not always required and that roughnesses are advantageously made to delimit either vertical lines 24a or inclined lines 24b or even crossed lines 24c.

If desired and as shown in FIG. 10, the two walls of the header-box flange can be milled, indented or otherwise roughened, to provide areas 25 and 25a. This arrangement is more particularly advantageous when the two walls of the header-box are covered with a coating of brazing alloy.

Roughnesses can also be formed on the inner wall of the vertical flange 14 of each tube plate. In such a case the lower portion of the skirt of the header-box may or may not be provided with the above described roughnesses.

The invention is not restricted to the embodiments shown and described in detail, for various modifications thereof can moreover be applied to it without departing from the scope of the invention. For example, the header-boxes can be not provided to bear by their edge 9 on a flat area of the tube plates but in such a case said edge 9 must be shaped to establish a continuous contact line with the portion opposite of the corresponding tube plate.

I claim:

1. A method for brazing radiators made of aluminum of which the parts are at least partly covered with a brazing film, comprising the steps of shaping the parts, providing said parts with contacting portions along the brazed junction to be made, said contacting portions comprising a substantially flat surface of one of the parts and a substantially linear portion of the other part, assembling the parts in relationship for which the contacting portions are substantially T-assembled in cross-section thus delimiting between said parts a continuous capillary passageway the width of which corresponds substantially to said linear portion, depositing a liquid flux only on the outside of the assembled parts whereby said flux is drawn through said continuous capillary passageway and in the vicinity thereof and wets only through capillary action a very small inner portion of said parts in the vicinity of said capillary passageway within the assembled parts, dehydrating the flux, heating the radiator to the melting temperature of the flux, whereby said parts are fluxed only on said portions wet by said flux, and comprising the further step of delimiting on said parts in the immediate vicinity of the brazed connections to be made narrow canals defined by the outer walls of the parts, whereby capillary housings are delimited to draw up and retain both the flux and the brazing material to be supplied to said capillary passageway, continuing heating the parts to melting temperature of the brazing film whereby the resulting liquid brazing material is drawn up only in the capillary passageways and portions wet with the flux.

2. Method for brazing radiators made of aluminum, as set forth in claim 1, wherein the parts are constituted by header-boxes and tube plates of a radiator and both steps of fluxing and brazing are made while the radiator is maintained in a position for which the header-boxes are vertically disposed.

3. Method as set forth in claim 1, comprising the further step of delimiting protruding members from said part delimiting the substantially flat surface, said protruding members being caused to bear against the outer wall of said part delimiting the substantially linear portion whereby said latter part is centered with respect to the other part thus causing said housing to be of uniform thickness.

4. Method as set forth in claim 1, comprising the further step of delimiting protruding members from said part delimiting the substantially flat surface, said protruding members being caused to bear against the outer wall of said part delimiting the substantially linear portion, and said protruding members further delimiting partitions extending transversally through said housings whereby said protruding members act both as centering members for said parts and dividers for said housings thus divided in successive collecting chambers for said flux and melted brazing material.

5. A method for brazing radiators made of aluminum of which the parts are at least partly covered with a brazing film, comprising the steps of shaping the parts, providing said parts with contacting portions along the brazed junction to be made, said contacting portions comprising a substantially flat surface of one of the parts and a substantially linear portion of the other part, assembling the parts in relationship for which the contacting portions are substantially T-assembled in cross-section thus delimiting between said parts a continuous capillary passageway the width of which corresponds substantially to said linear portion, depositing a liquid flux only on the outside of the assembled parts whereby said flux is drawn through said continuous capillary passageway and in the vicinity thereof and wets only through capillary action a very small inner portion of said parts in the vicinity of said capillary passageway within the assembled parts, dehydrating the flux, heating the radiators to the melting temperature of the flux, whereby said parts are fluxed only on said portions wet by said flux, continuing heating the parts to melting temperature of the brazing film whereby the resulting liquid brazing material is drawn up only in the capillary passageways and portions wet with the flux, and comprising the further step of eliminating the brazing film covering one of the parts in the area thereof where the brazed connection is to be made.

6. Method for brazing radiators made of aluminum, as set forth in claim 5, wherein the parts are constituted by header-boxes and tube plates of a radiator and both steps of fluxing and brazing are made while the radiator is maintained in a position for which the header-boxes are vertically disposed.

* * * * *